[19] United States Patent
Kojyo et al.

[11] Patent Number: 4,972,131
[45] Date of Patent: Nov. 20, 1990

[54] METHOD OF AN APPARATUS FOR CONTROLLING VELOCITY OF INDUSTRIAL ROBOT

[75] Inventors: Kazunobu Kojyo, Fujisawa; Yasuhide Nagahama; Manabu Nagata, both of Kamakura, all of Japan

[73] Assignee: Kabushiki Kaisha Kobe Seiko Sho, Kobe, Japan

[21] Appl. No.: 380,118

[22] Filed: Jul. 14, 1989

[30] Foreign Application Priority Data

Mar. 29, 1989 [JP] Japan .................................. 1-175061

[51] Int. Cl.$^5$ .......................................... G05B 11/00
[52] U.S. Cl. ................. 318/568.1; 318/594; 318/592; 901/20; 364/513
[58] Field of Search ................................ 318/560-634; 364/513, 474.34; 901/1-20

[56] References Cited

U.S. PATENT DOCUMENTS 4,348,731  9/1982  Kogawa ........................ 901/20 X
4,710,865 12/1987  Higomura ...................... 318/594 X Primary Examiner—William M. Shoop, Jr.
Assistant Examiner—Paul Ip
Attorney, Agent, or Firm—Oblon, Spivak, McClelland, Maier & Neustadt

[57] ABSTRACT

A method of and apparatus for controlling the velocity of an industrial robot where the velocity is controlled without producing an edge when an instruction velocity is higher than an allowable velocity and an operator can readily recognize the actual velocity of the robot. The method includes the setting of an allowable velocity for a first step section or each of step sections in an acceleration or deceleration section between taught points for each of the axes of the robot. At the first or each step section an instruction velocity to each axis is compared with a corresponding allowable velocity, and when the former is higher than the latter, a control cycle after which a next trigger signal is to be developed is modified using the allowable and instruction velocities. Upon such first playback operation, data related to a maximum velocity which is reached by modification of the control cycle is stored in memory, and then, in a next playback operation or operations, the maximum velocity is computed in accordance with the stored data. The thus computed maximum velocity is used in place of the instruction velocity and displayed on a display.

6 Claims, 5 Drawing Sheets

METHOD OF AN APPARATUS FOR CONTROLLING VELOCITY OF INDUSTRIAL ROBOT

BACKGROUND OF THE INVENTION

1. Field of the Invention

This invention relates to a method of and apparatus for controlling a velocity of an industrial robot such as a welding robot which makes a playback operation between taught points.

2. Description of the Prior Art

Referring to FIG. 6, there is shown in a diagrammatic representation an exemplary welding process which is taken by an industrial robot such as, for example, a welding robot. In a section between points P2 and P3 or between points P5 and P6 indicated by notched lines in FIG. 6, arc welding is performed at a velocity within an allowable velocity range which is determined in accordance with a designated welding leg length in advance. To the contrary, in any one of the other sections of P1-P2, P3-P4-P5 and P6-P7, the robot is moved in order to move to the welding section P2-P3 or P5-P6, and each of the sections will be hereinafter referred as to an air cut section. In any air cut section, there is no limitation in velocity of the robot from a welding operation, and actually, the velocity of the robot here is determined in accordance with performances of motors of individual axes and so forth of the robot, that is, in accordance with the performance of the robot itself.

Where the velocity of movement of an end of an arm of the robot in any air cut section is set, normally the velocity of the robot is controlled in accordance with a velocity pattern as indicated by a chain line in FIG. 7. As seen from the velocity pattern, predetermined periods of time are required for an acceleration section to an instruction velocity $V_0$ and for a deceleration section to stopping or zero velocity.

Meanwhile, an allowable velocity Vmax is set in advance. Such allowable velocity Vmax is the maximum velocity of the robot, and in the case of a lower arm of an articulated robot, the allowable velocity Vmax is limited by a maximum velocity of rotation of a driving motor for a lower arm axis S2 and is about 80 m/min or so. Then, if the instruction velocity $V_0$ is higher than the allowable velocity Vmax, this will lead to an error in operation of the robot. Accordingly, at a point of time at which the allowable velocity Vmax is reached during acceleration of the robot as indicated by a solid line in FIG. 7, the control cycle is elongated in accordance with the instruction velocity $V_0$ and the allowable velocity Vmax, for example, to ($V_0$/Vmax)×(ordinary control cycle) so that the velocity of the robot may not be accelerated to the instruction velocity $V_0$ and maintain the allowable velocity Vmax. Then, the velocity of the robot is decelerated from the allowable velocity Vmax. In particular, the velocity of the robot is controlled in a substantially trapezoidal velocity pattern which is obtained by cutting an upper portion of the ordinary velocity pattern shown by a chain line in FIG. 7 away along a horizontal line of the allowable velocity Vmax. Such velocity control is disclosed, for example, in Japanese Patent Laid-Open No. 63-80307.

With the velocity control, after an instruction velocity $V_0$ is taught, there is no necessity of checking, in a test mode, whether or not the instruction velocity $V_0$ is higher than the allowable velocity Vmax and an error may take place. Accordingly, teaching can be performed rapidly.

However, with such a conventional velocity controlling means as described above, since a function of moderated acceleration and deceleration is not taken into consideration, in case the instruction velocity $V_0$ is higher than the allowable velocity Vmax, the robot is controlled in such a velocity pattern as indicated by a solid line in FIG. 7. Consequently, two edges E are produced at a point of time at which the robot moves from the acceleration section to the section of the allowable velocity Vmax and another point of time at which the robot moves from the section of the allowable velocity Vmax to the deceleration section. At each of such edges E, high vibrations will be produced at an arm or some other components of the robot and have a bad influence on the accuracy in control of the robot.

Further, with the conventional controlling means described hereinabove, an actual velocity of the robot is sometimes different from an instruction velocity. In such an instance, however, there is no measures for an operator to find out an actual velocity of movement of the robot. Accordingly, it is expected to enable an industrial robot to inform an operator or the like of an actual velocity of the robot.

SUMMARY OF THE INVENTION

It is an object of the present invention to provide a method of controlling the velocity of an industrial robot wherein the velocity of the robot is controlled without producing an edge when an instruction velocity is higher than an allowable velocity in order to prevent possible production of vibrations by an edge with certainty and improve the accuracy in control of the robot.

It is another object of the present invention to provide an apparatus for controlling the velocity of an industrial robot with which an operator of the robot can readily recognize the actual velocity of the robot which is modified by an automatic computation by the apparatus.

In order to attain the objects, according to one aspect of the present invention, there is provided a method of controlling the velocity of an industrial robot of the type which makes a playback operation between taught points and develops, after each required control cycle, a trigger signal which provides a timing for controlling the position of the robot with an aimed position provided by one of dividing points which divide a distance between the taught points into a plurality of sections, which comprises the steps of setting an allowable velocity for a first step in an acceleration section or a deceleration section for each of axes of the industrial robot, comparing, at the first step, an instruction velocity to each of the axes and the corresponding allowable velocity with each other, modifying, when the instruction velocity is higher than the allowable velocity, a control cycle after which a next trigger signal is to be developed using values of the allowable velocity and the instruction velocity, and maintaining the thus modified control cycle for the acceleration section or the deceleration section. With the method, a moderated acceleration/deceleration function is attained. Accordingly, there is an effect that possible production of vibrations by an edge can be prevented with certainty and the accuracy in control of the robot is improved significantly.

Preferably, a playback operation for the first time is executed while maintaining the modified control cycle for the acceleration section or the deceleration section, and data related to a maximum velocity which is reached by such modification of the control cycle is stored in memory, whereafter in a playback operation for each of the second and following playback operations, the maximum velocity is computed in accordance with the thus stored data and the thus computed maximum velocity is used in place of the instruction velocity. Accordingly, a further moderated acceleration/deceleration function is attained, and there is an effect that possible production of vibrations by an edge can be prevented with certainty and the accuracy in control of the robot is improved significantly. Besides, a learning control function to modify a taught instruction velocity is attained for a playback operation for any of the second and following times, and there is an additional effect that an increase in acceleration/deceleration time can be prevented.

According to another aspect of the present invention, there is provided a method of controlling the velocity of an industrial robot of the type which makes a playback operation between taught points and develops, after each required control cycle, a trigger signal which provides a timing for controlling the position of the robot with an aimed position provided by one of dividing points which divide a distance between the taught points into a plurality of sections, which comprises the steps of setting an allowable velocity for each step in an acceleration section or a deceleration section for each of axes of the industrial robot, comparing, at each step in the acceleration section or the deceleration section, an instruction velocity to each of the axes and the corresponding allowable velocity, and modifying, when the instruction velocity is higher than the allowable velocity, a control cycle after which a next trigger signal is to be developed using individual values of the allowable velocity and the instruction velocity. Accordingly, a moderated acceleration/deceleration function is attained.

Preferably, a playback operation for the first time is performed while involving modification of the control cycle, and data related to a maximum velocity which is reached by such modification of the control cycle is stored in memory, whereafter in a playback operation for each of the second and following playback operations, the maximum velocity is computed in accordance with the thus stored data and the thus computed maximum velocity is used in place of the instruction velocity. Accordingly, a further moderated acceleration/deceleration function is attained, and there is an effect that possible production of vibrations by an edge can be prevented with certainty and the accuracy in control of the robot is improved significantly. Further, although the acceleration/deceleration time is increased a little in the playback operation for the first time because a real time processing to elongate the control cycle is executed, velocity control is executed, in each of playback operations for the second and following times, with the ordinary control cycle at an instruction velocity provided by the maximum velocity in the playback operation for the first time. Accordingly, the acceleration/deceleration time is not increased in any of the playback operations for the second and following times. Besides, a learning control function to modify a taught instruction velocity is attained for a playback operation for any of the second and following times, and there is an additional effect that an increase in acceleration/deceleration time can be prevented.

According a further aspect of the present invention, there is provided an apparatus for controlling the velocity of an industrial robot of the type which makes a playback operation between taught points and develops, after each required control cycle, a trigger signal which provides a timing for controlling the position of the robot with an aimed position provided by one of dividing points which divide a distance between the taught points into a plurality of sections, which comprises an allowable velocity setting means for setting an allowable velocity for a first step or for each of steps in an acceleration section or a deceleration section for each of axes of the industrial robot, a comparing means for comparing, at the first step or at each of the steps, an instruction velocity to each of the axes and the corresponding allowable velocity, a control cycle computing means responsive to a result of such comparison from the comparing means for modifying, when the instruction velocity is higher than the allowable velocity, a control cycle after which a next trigger signal is to be developed using individual values of the allowable velocity and the instruction velocity, a storage means for storing therein in a playback operation for the first time data related to a maximum velocity which is reached by modification of the control cycle by the control cycle computing means, and a maximum velocity computing means for computing, in a playback operation for any of the second and following times, the maximum velocity in accordance with the data from the storage means and for setting the thus obtained maximum velocity in place of the instruction velocity. Accordingly, a moderated acceleration/deceleration function is attained, and there is an effect that possible production of vibrations by an edge can be prevented with certainty and the accuracy in control of the robot is improved significantly. Further, a learning control function to modify a taught instruction velocity is attained for a playback operation for any of the second and following times, and there is an additional effect that an increase in acceleration/deceleration time can be prevented.

According to a still further aspect of the present invention, there is provided an apparatus for controlling the velocity of an industrial robot of the type which interpolates a distance between taught points with a predetermined locus to make a playback operation, which comprises a velocity controlling means for converting an instruction velocity of movement between the taught points into instruction velocities for individual axes of the industrial robots, comparing each of the thus converted instruction velocities for the axes with a corresponding one of allowable velocities for the axes, selecting, when the instruction velocity is higher than the allowable velocity, one of the axes at which the ratio of the instruction velocity to the corresponding allowable velocity presents a maximum value, and modifying the instruction velocity of movement between the taught points such that the instruction velocity of the one axis may be lower than the allowable velocity, a computing means for computing the thus modified instruction velocity of movement between the taught points, and a display means for displaying thereon the instruction velocity of movement thus computed by the computing means. Accordingly, a moderated acceleration/deceleration function is attained, and there is an effect that possible production of vibrations by an edge can be prevented with certainty and the accuracy in control of the robot is improved significantly. Further, since the instruction velocity of movement between the taught points computed by the computing means is displayed by the display means, an operator is visually informed of the instruction velocity of movement and can readily recognize an actual velocity of movement of the robot.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
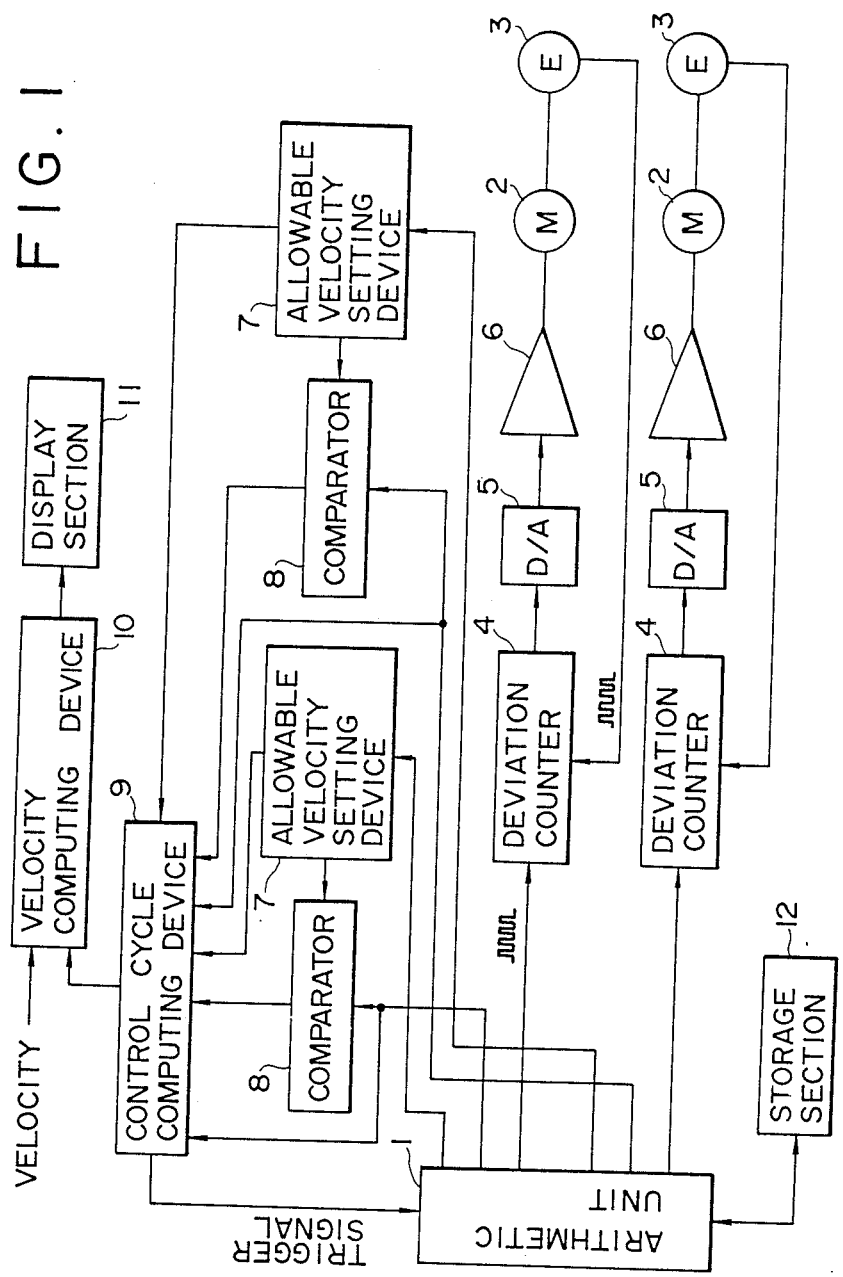
FIG. 1 is a block diagram of an apparatus for controlling the velocity of an industrial robot to which the present invention is applied.

Referring first to FIG. 1, there is shown an apparatus for controlling the velocity of an industrial robot to which the present invention is applied. The apparatus here is designed as an apparatus for controlling the velocity of a two axis articulated welding robot.

The velocity controlling apparatus shown includes an arithmetic unit 1 which develops, each time a trigger signal which will be hereinafter described is received, velocity instruction signals for motors connected to individual axes of a robot for driving articulations of the robot, that is, robot position instruction signals for one of a plurality of aimed positions between two taught points. The velocity controlling apparatus further includes an encoder 3 for detecting the actual velocity of each of the motors 2 (each of the axes), and a deviation counter 4 for counting a deviation of an actual velocity received from each of the encoders 3 from a corresponding instruction velocity received from the arithmetic unit 1. The velocity controlling apparatus further includes a digital to analog converter 5 connected to each of the deviation counters 4 and a driver 6 connected to each of the digital to analog converters 5. The velocity controlling apparatus further includes an allowable velocity setting device 7 for setting an allowable velocity Vmax for each axis in advance, and a comparator 8 for comparing an instruction velocity $V_0$ from the arithmetic unit 1 and an allowable velocity Vmax from each of the allowable velocity setting devices 7 with each other and for developing a control cycle modifying signal when the instruction velocity $V_0$ is higher than the allowable velocity Vmax but developing a control cycle maintaining signal in any other case.

It is to be noted that the allowable velocity varies for each step in an acceleration section or a deceleration section and is different from that in a fixed velocity section. Accordingly, a signal indicating at which step in an acceleration or deceleration section the robot is or that the robot is in a fixed velocity section is delivered from the arithmetic unit 1 to each one of the allowable velocity setting devices 7, and in response to such signals, the allowable velocity setting devices 7 deliver individual allowable velocities corresponding to the relevant section or step to the comparators 8.

The velocity controlling apparatus further includes a control cycle computing device (velocity controlling means) 9 for delivering a trigger signal for robot position control to the arithmetic unit 1 at a required timing (control cycle). The control cycle computing device 9 are connected to receive a control cycle modifying signal or a control cycle maintaining signal from any of the comparators 8 and receive signals from the arithmetic unit 1 and the allowable velocity setting devices 7. If a control cycle modifying signal is received from one of the comparators 8, a time (control cycle) until a positioning instruction (trigger signal) for a next point is subsequently delivered is modified using values of an allowable velocity Vmax and an instruction velocity $V_0$ of one of the axes at which the maximum difference between the allowable velocity Vmax and the instruction velocity $V_0$ presents a maximum value.

The velocity controlling apparatus further includes a velocity computing device (computing means) 10 for computing an actual velocity of the industrial robot (instruction velocity of movement between taught points). The velocity computing device 10 computes, when a control cycle is modified by the control cycle computing device 9, an actual velocity of the industrial robot in such a manner as will be hereinafter described in accordance with a ratio between a control cycle after such modification and another control cycle (predetermined control cycle) before such modification and also with a preset value in the industrial robot. The velocity controlling apparatus further includes a display section (display means) 11 provided on a teaching box or the like of the robot for displaying a result of a computation (actual velocity) by the velocity computing device 10.

The velocity controlling apparatus additionally includes a storage section (storage means) 12 for storing therein in a playback operation for the first time data regarding a maximum velocity which is reached by modification of a control cycle by the control cycle computing device 9 (data used in the computation of the control cycle, and in the present embodiment, a ratio between an instruction velocity and an allowable velocity). In the velocity controlling apparatus of the present embodiment, the arithmetic unit 1 has a function as a maximum velocity computing means for computing, in a playback operation for each of the second and following times, a maximum velocity in accordance with data from the storage section 10 and for setting the value obtained by the computation in place of an instruction velocity.

The velocity controlling apparatus of the present embodiment of the present invention has such a construction as described above and operates in the following manner.

It is assumed here that a velocity (composite velocity of movement) of, for example, 150 m/min is inputted and set as a preset value in the industrial robot and the preset velocity cannot be attained at the bottleneck of a pivot shaft S1. Here, it is also assumed that the number of instruction movement pulses (instruction velocity $V_0$) within a next control cycle of the pivot shaft which are to be developed from the arithmetic unit 1 is equal to 10,000.

Figure 2:
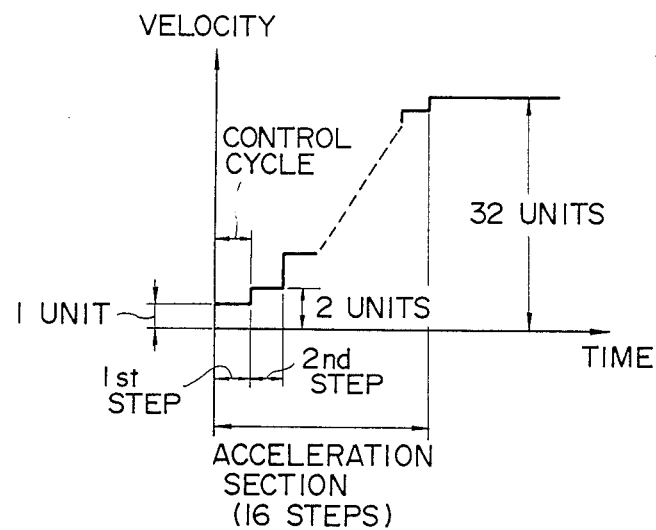
FIGS. 2 and 3 are graphs illustrating different stages of movement of the robot by the apparatus shown in FIG. 1.

Further, it is assumed that the acceleration control to an instruction velocity or the deceleration control is effected with 16 steps (normally 0.32 seconds because normally 0.02 seconds is required for one step) as an acceleration or deceleration control time. Meanwhile, a velocity after a fixed velocity state is reached is equally divided into up to 32 fractions which are hereinafter referred to as 32 units. Accordingly, for such an acceleration section from a velocity equal to zero to an instruction velocity as illustrated in FIG. 2, an allowable velocity at a first step of the acceleration section (equal to 1/32 the allowable velocity of each axis upon acceleration) is set in advance in each of the allowable velocity setting devices 7. In particular, if the allowable velocity of a pivot shaft motor for a control cycle of 20 milliseconds is equal to 8,000 pulses, then an allowable velocity equal to 8000/32 pulses for a first step upon acceleration is set in advance in the allowable velocity setting device 7 for the pivot shaft.

Then, a motor movement amount $\Delta L$ of each axis per control cycle computed by coordinate transformation in accordance with an instruction velocity $V_0$ to each axis delivered from the arithmetic unit 1 is compared by a corresponding one of the comparators 8 with the corresponding allowable velocity $V_{max}/32$ (250 pulses in the case of the example described above) set by the corresponding allowable velocity setting device 7. In case the motor movement amount $\Delta L$ is greater than the corresponding allowable velocity $V_{max}/32$, the ordinary control cycle of 20 milliseconds is elongated in proportion to a ratio between them. For example, from the motor movement amount $\Delta L$ related to the instruction velocity $V_0$ and the allowable velocity $V_{max}/32$ for the first step related to the allowable velocity $V_{max}$, a computation of the following expression $$\{\Delta L/(V_{max}/32)\}\cdot 20 = (32\cdot\Delta L/V_{max})\cdot 20 \text{ (msec)}$$

is executed by the control cycle computing device 9. Accordingly, the cycle or interval of time until a next trigger signal is to be developed is elongated from 20 milliseconds to, for example, 30 milliseconds.

After then, at each of the second and following steps, the acceleration control is executed while maintaining the control cycle (for example, 30 milliseconds) computed in accordance with the expression given above. Then, after completion of the acceleration control (after lapse of 0.48 seconds of the acceleration time because 30 milliseconds is required for one step) of such 16 steps, the allowable movement velocity of 8,000 pulses for the pivot shaft corresponding to the allowable velocity $V_{max}$ for fixed velocity operation is set into the corresponding allowable velocity setting device 7, and if it is assumed that the ordinary or predetermined control cycle is equal to 20 milliseconds, then an automatic maximum velocity setting function operates in the following manner to achieve an elongation of the control cycle.

In short, the instruction movement pulses and the allowable movement pulses are compared with each other by the corresponding comparator 8. In this instance, since naturally the instruction movement pulses are higher than the allowable movement pulses, a control cycle modifying signal is delivered from the comparator 8 to the control cycle computing device 9. The control cycle computing device 9 thus elongates the control cycle in accordance with an expression of, for example, $(V_0/V_{max})\times$(predetermined control cycle) from the instruction velocity $V_0$ (10,000 pulses) and the allowable velocity $V_{max}$ (8,000 pulses). In the case of the numerical values mentioned above, the control cycle is elongated to.

$$20 \times \frac{10,000}{8,000} = 25 \text{ milliseconds}$$

It is to be noted that where each fraction of the control cycle is equal to 2 milliseconds, the control cycle is not elongated to 25 milliseconds, but the quotient is naturally raised for the object of elongation of the control cycle, and consequently, the control cycle is elongated from 20 milliseconds to 26 milliseconds. Accordingly, the amount of movement of the pivot shaft per 20 milliseconds is equal to $10,000\times(20/26)\approx 7,692$ pulses. Thus, a maximum velocity which is closer to the allowable pulse number of 8,000 can be attained.

The control cycle computing device 9 elongates the control cycle in this manner and delivers a trigger signal after a thus elongated control cycle to the arithmetic unit 1 so that the velocity control is executed at a maximum velocity which does not exceed the allowable velocity $V_{max}$. It is to be noted that the arithmetic unit 1 delivers pulses for movement to a next point, and in response to such pulses, each of the deviation counters 4 controls the motor 2 in a direction in which the count of the deviation counter 4 is reduced to zero.

In this instance, according to the present embodiment, an actual velocity of each axis of the industrial robot is computed by the velocity computing device 10 in accordance with a ratio between a predetermined control cycle and a control cycle modified by the automatic maximum velocity setting function and also to a preset velocity to the industrial robot. In short, an actual velocity (velocity after correction) is computed by multiplying a ratio between the modified control cycle of 26 milliseconds and the predetermined control cycle of 20 milliseconds by the preset velocity of 150 m/min. Here, an actual velocity of 150 m/min$\times(20/26)\approx 115$ m/min is obtained. Then, the result of the computation, that is, the actual velocity, is displayed on the display section 11 provided on the teaching box or the like and is notified to the operator and so forth.

It is to be noted that, because the display section 11 may not provide a readily observable indication if an actual velocity is displayed on the display section 11 for each control cycle (26 milliseconds in the example described above), in such an instance, a thinned-out indication may be provided at a rate of once for each 5 control cycles, that is, once for 0.13 seconds.

In this manner, according to the apparatus of the present embodiment, in case there is a difference between an instruction velocity and an actual velocity (instruction velocity of movement between taught points), the actual velocity is computed by the velocity computing device 10 and displayed on the display section 11 by the automatic maximum velocity setting function (velocity controlling means). Accordingly, an operator and so on can readily recognize an actual velocity of movement of the robot.

Further, while in the present embodiment the velocity computing device 10 can be constructed making use of a CPU (central processing unit) for controlling the robot and a display unit existing on the teaching box can be utilized as the display section 11, there is no necessity of provision of an additional equipment in order to realize the apparatus of the present invention, and accordingly, there is no need of an additional installation cost.

It is to be noted that the velocity computation by the velocity computing device 10 and the display of a velocity on the display section 11 in the embodiment described above may otherwise be performed only when the instruction velocity exceeds the allowable velocity so that there is the necessity of elongating the control cycle.

Further, while in the embodiment described above the present invention is applied to a velocity controlling apparatus for an industrial robot which is provided only with an automatic maximum velocity setting function, the present invention can be applied similarly to such a conventional velocity controlling apparatus which is provided with a moderated accelerating/decelerating function in addition to an automatic maximum velocity setting function described above.

In addition, while in the embodiment described above the robot has two axes, the method of the present invention can be applied similarly to any other multiaxis robot and also to a spherical coordinates robot, a cylindrical coordinates robot, a rectangular coordinates robot and an articulated robot.

It is to be noted that while in the embodiment described above a substantial velocity of movement is modified by modification of a control cycle which provides an output timing of a trigger signal and an instruction velocity is computed into an actual velocity with a ratio with which the control cycle is elongated and then the actual velocity is displayed, if the computing velocity of the controlling CPU is sufficiently high, an interpolation computation and an inverse transformation to compute a position of each axis from a position of an end of the robot may be performed each time, and in case the the amount of movement of each axis is greater than an allowable value for the same, the preset instruction velocity may be modified with the ratio and then an interpolation computation may be repeated again while at the same time an instruction velocity obtained here after such modification may be displayed.

Figure 3:
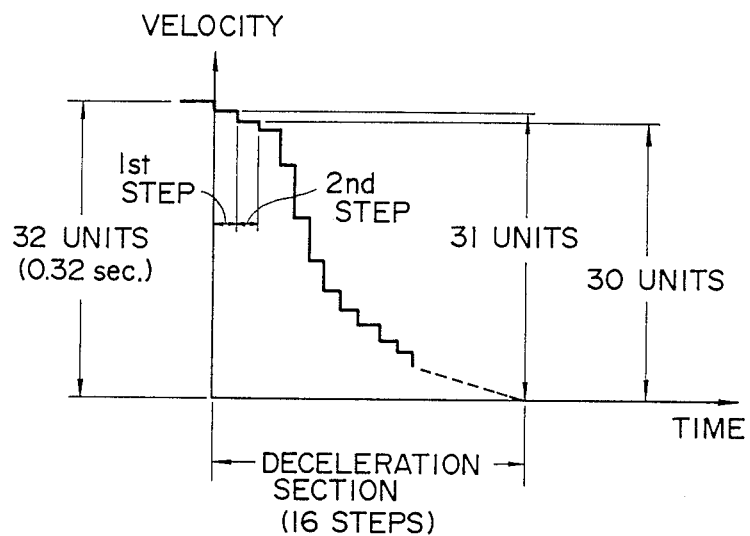

Subsequently, in such a deceleration section from the instruction velocity described hereinabove to the velocity equal to zero as illustrated in FIG. 3, at a first step in the deceleration section, a motor movement amount $\Delta L$ of each axis (output from the computing device 1) in the control cycle immediately preceding to the deceleration section is compared by the corresponding comparator 8 with an allowable velocity Vmax for the corresponding axis set by the corresponding allowable velocity setting device 7. Since here the motor movement amount $\Delta L$ is greater than the allowable velocity Vmax, the ordinary control cycle of 20 milliseconds is elongated, for example, to 30 milliseconds in proportion to a ratio between them in a similar manner as in the acceleration section. Then, in each of the second and following steps, control is executed while maintaining the control cycle of 30 milliseconds for the first step. At the same time, however, a computation of comparing the allowable velocity Vmax with the motor movement amount $\Delta L$ to elongate the control cycle is also caused to function, and in case a control cycle obtained by the computation assumes a value which exceeds 30 milliseconds (for example, a value equal to 32 milliseconds), the value will be adopted preferentially.

The first playback operation is executed in such a manner as described above. In this instance, a ratio between the instruction velocity $V_0$ and the allowable velocity Vmax (where the instruction velocity $V_0$ is 150 m/min and the allowable velocity Vmax is 100 m/min, 150/100=1.5) is stored into the storage section 12.

Then, in each of the second and following playback operations, a maximum velocity (which normally corresponds to an allowable velocity Vmax) is computed by the arithmetic unit 1 in accordance with the thus stored value. In particular, the instruction velocity $V_0$ is divided by the ratio (1.5). The arithmetic unit 1 thus delivers a thus obtained value in place of the instruction velocity $V_0$ so that the following velocity control is executed with the normal control cycle (20 milliseconds).

Subsequently, a velocity controlling method for an industrial robot to which the present invention is applied will be described in detail. The velocity controlling method is executed on the velocity controlling apparatus described hereinabove.

At first, in the acceleration section from the zero velocity to the instruction velocity, allowable velocities for the first to 16th steps of the acceleration section are set in advance into each of the allowable velocity setting devices 7. In particular, as shown in FIG. 2, the allowable velocities Vmax/32, 2. Vmax/32, . . . , and Vmax are set successively beginning with the first step with ratios of the velocity units which occupy in the full 32 units like one unit for the first step, two units for the second step, and so forth.

Then, for each step, a motor movement amount $\Delta L$ of each axis for each control cycle which is found out by coordinate transformation in accordance with an instruction velocity $V_0$ to the axis delivered from the arithmetic unit 1 is compared by the corresponding comparator 8 with an allowable velocity (Vmax/32, 2. Vmax/32, . . . , or Vmax) for the revelant step in advance in the corresponding allowable velocity setting device 7. In case the motor movement amount $\Delta L$ is greater than the allowable velocity, the normal control cycle is elongated using the motor movement amount $\Delta L$ related to the instruction velocity $V_0$ and the allowable velocity for the relevant step related to the allowable velocity Vmax.

For example, where the motors for the individual axes have a maximum velocity of 3,000 rpm and make one complete rotation by up to 8,000 pulses, the maximum velocity is $(3,000/60) \times 8,000 = 400,000$ pulses, and each control cycle of 20 milliseconds thus involves $400,000 \times (20/1,000) = 8,000$ pulses. The full velocity units are 32 units in an acceleration section, and if it is assumed now that the velocity at an acceleration step is 16 units, then the maximum movement amount of each axis within a control cycle (allowable velocity at the 16th step set in the corresponding allowable velocity setting device 7) is determined to be $8,000 \times (16/32) = 4,000$ pulses, and a similar control is executed with such 4,000 pulses. In particular, for 10,000 pulses, control is executed with a cycle of $20 \times (10,000/4,000) = 50$ milliseconds. In this instance, the arithmetic unit 1 either develops a ratio with which units at a next step occupay the full units (32 units, for example) or the number of the full units and on which step a next step falls. The corresponding allowable velocity setting device 7 thus receives the output of the arithmetic unit 1 and either fetches a number of pulses corresponding to the relevant step from the memory or computes such number to obtain an allowable velocity (pulse number).

After the control cycle computing device 9 elongates the control cycle and delivers a trigger signal and then the control for the acceleration section is completed in such a manner as described above, the ordinary automatic maximum velocity setting function is rendered effective to execute driving control with the allowable velocity Vmax.

To the contrary, in the deceleration section from the instruction velocity to the zero velocity described hereinabove, an appropriate maximum velocity at each deceleration step is found out from a ratio between the velocity unit number at the relevant step and the full unit number in a similar manner as in the acceleration section described above, and in case a motor movement amount computed by a coordinate computation using the value exceeds the value, the control cycle is elongated with a ratio between them by the control cycle computing device 9.

The playback operation for the first time is executed in such a manner as described above, but since in the present embodiment an allowable velocity is set for each step, a ratio between an instruction velocity and an allowable velocity is obtained for each step. However, in the present embodiment, a certain representative value such as an average value of a plurality of ratios, a first value, an intermediate value or a last value is stored as data into the storage section 12.

Then, in any of the second and following playback operations, the arithmetic unit 1 finds out a maximum velocity (which normally corresponds to an allowable velocity Vmax) by dividing an instruction velocity $V_0$ by the stored value and delivers therefrom the maximum velocity in place of the instruction value $V_0$ and the velocity control after then is executed with the normal control cycle (20 milliseconds) in a similar manner as in the proceding embodiment described hereinabove.

It is to be noted that the arithmetic unit 1 is constructed such that it delivers movement pulses to a next point and the deviation counters 4 control, in response to such pulses, the motors 2 in a direction in which the counts thereof are reduced finally to zero. Then, although the delivery of a number of pulses corresponding to the instruction velocity (corresponding to the motor movement amount described above) is executed normally for each predetermined control cycle (20 milliseconds, for example), in case the pulses exceed pulses corresponding to the allowable velocity for each axis at the first step or any of the following steps in the acceleration or deceleration section, the computation of the expression given hereinabove is executed by the control cycle computing device 9 to obtain an appropriate cycle (30 milliseconds, for example) and the control cycle computing device 9 thus delivers a trigger signal after lapse of each appropriate cycle so that next instruction pulses may be developed from the arithmetic unit 1.

Further, while the velocity controlling apparatus shown in FIG. 1 is applied to the robot having two axes, the present method can be applied similarly to any other multi-axis robot and also to a spherical coordinates robot, a cylindrical coordinates robot, a rectangular coordinates robot and an articulated robot. Further, the present method can be applied similarly whether the control is PTP control, CP control or some other control.

Figure 4:
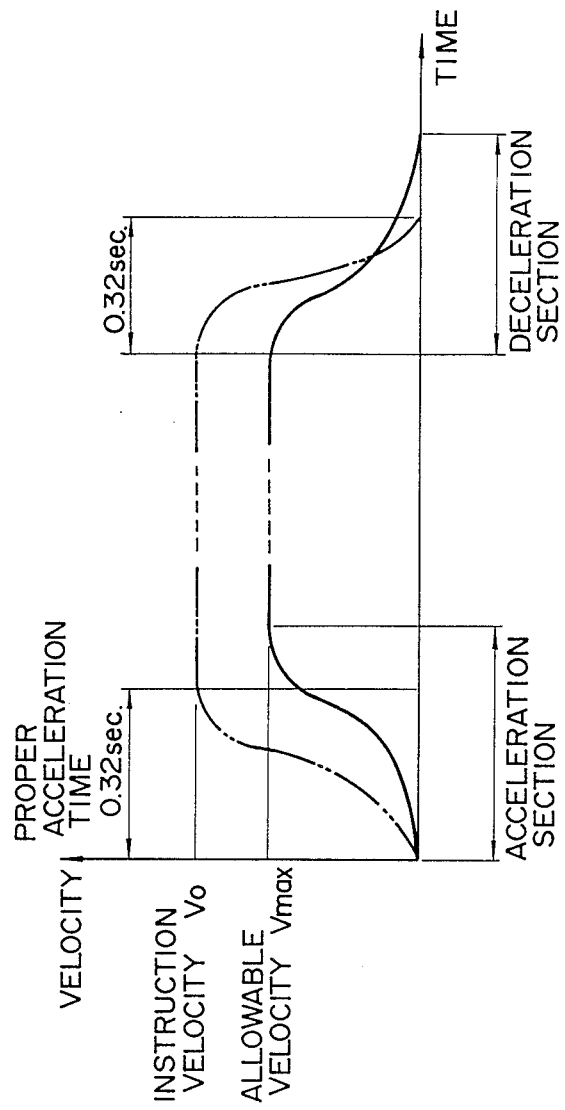
FIG. 4 is a graph illustrating general movement of the robot by the apparatus shown in FIG. 1.

In this manner, according to the method of the present embodiment, a moderated acceleration/deceleration function can be attained by either of the first and second embodiments described hereinabove, and in case the instruction velocity $V_0$ exceeds the allowable velocity Vmax as shown in FIG. 4, velocity control is executed without producing such an edge as is produced by the conventional method, and consequently, production of noises by such edge is prevented with certainty. Accordingly, the accuracy in control of the robot is improved significantly.

Figure 5:
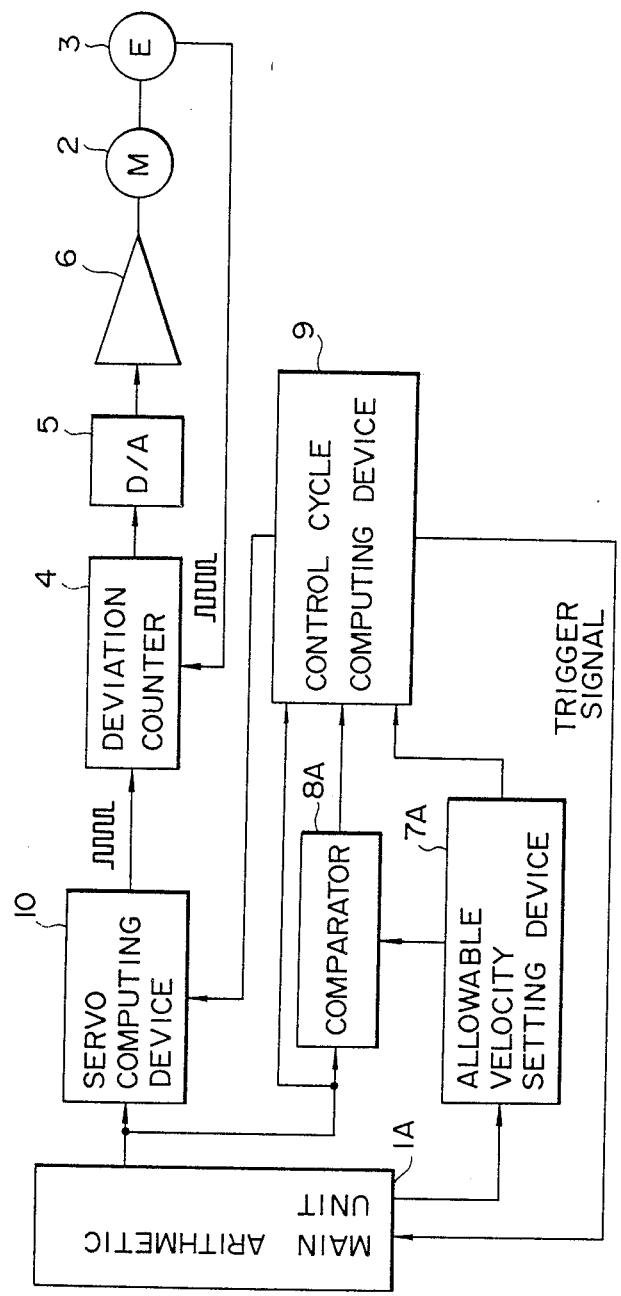
FIG. 5 is a block diagram showing a modified apparatus for controlling the velocity of an industrial robot.
Figure 6:
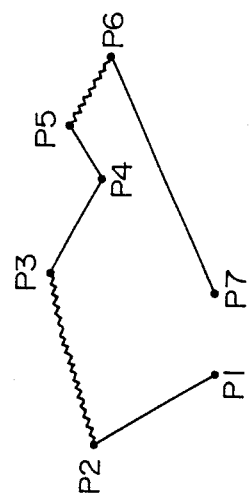
FIG. 6 is a diagrammatic representation illustrating a welding process by an arc welding robot.
Figure 7:
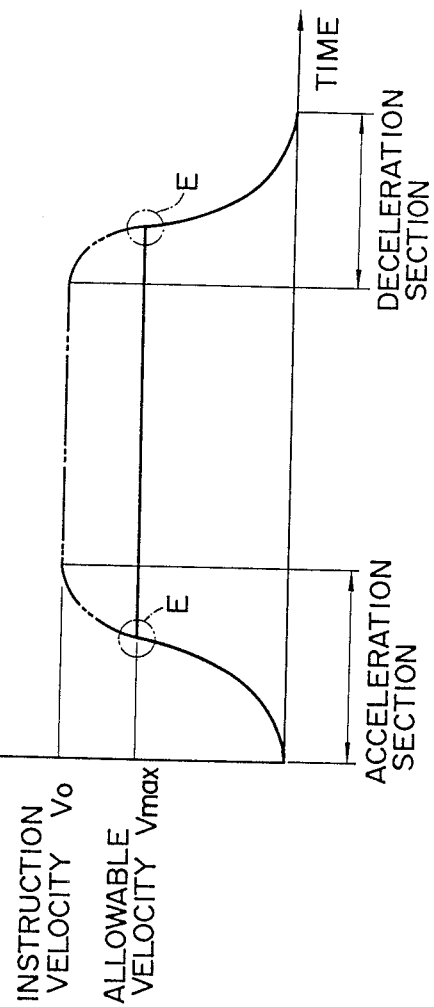
FIG. 7 is a graph illustrating an operation of an industrial robot by a conventional velocity controlling means.

It is to be noted that since it is advantageous for servo control that pulses to be received by the deviation counters 4 be spaced by an equal time distance, an apparatus having such a construction as shown in FIG. 5 may be employed in place of the apparatus shown in FIG. 1. In the apparatus shown in FIG. 5, a number of movement pulses to a next interpolation point is delivered from a main arithmetic unit 1A, and it is checked by a comparator 8A whether or not the number exceeds an allowable velocity. In case the number exceeds the allowable velocity, an appropriate control cycle is computed by a control cycle computing device 9. Thus, a next trigger signal to the main arithmetic unit 1A is developed at a delayed timing while a control cycle is delivered to a servo computing device 10 as data from which a train of equidistantly spaced pulses is to be produced from the control cycle computing device 9. With the construction, the present method can be reduced to practice while pulses to be received by the deviation counters 4 are spaced by an equal time distance from each other. Further, with the apparatus shown in FIG. 5, an allowable velocity set in an allowable velocity setting device 7A is not a fixed value but can be modified in response to a signal from the main arithmetic unit 1A.

Having now fully described the invention, it will be apparent to one of ordinary skill in the art that many changes and modifications can be made thereto without departing from the spirit and scope of the invention as set forth herein.

What is claimed is:

1. A method of controlling the velocity of an industrial robot of the type which makes a playback operation between taught points and develops, after each required control cycle, a trigger signal which provides a timing for controlling the position of said robot with an aimed position provided by one of dividing points which divide a distance between the taught points into a plurality of sections, said method comprising the steps of:
   setting an allowable velocity for a first step section in an acceleration section or a deceleration section for each of axes of said industrial robot,
   comparing, at the first step section, an instruction velocity to each of said axes and the corresponding allowable velocity with each other,
   modifying, when the instruction velocity is higher than the allowable velocity, a control cycle after which a next trigger signal is to be developed using values of the allowable velocity and the instruction velocity, and
   maintaining the thus modified control cycle for the acceleration section or the deceleration section.

2. A method of controlling the velocity of an industrial robot according to claim 1, wherein a playback operation for the first time is executed while maintaining the modified control cycle for the acceleration section or the deceleration section, and data related to a maximum velocity which is reached by such modification of the control cycle is stored in memory, whereafter in a playback operation for each of the second and following playback operations, the maximum velocity is computed in accordance with the thus stored data and the thus computed maximum velocity is used in place of the instruction velocity.

3. A method of controlling the velocity of an industrial robot of the type which makes a playback operation between taught points and develops, after each required control cycle, a trigger signal which provides a timing for controlling the position of said robot with an aimed position provided by one of dividing points which divide a distance between the taught points into a plurality of sections, said method comprising the steps of:

setting an allowable velocity for each step section in an acceleration section or a deceleration section for each of axes of said industrial robot, comparing, at each step section in the acceleration section or the deceleration section, an instruction velocity to each of said axes and the corresponding allowable velocity, and modifying, when the instruction velocity is higher than the allowable velocity, a control cycle after which a next trigger signal is to be developed using individual values of the allowable velocity and the instruction velocity.

4. A method of controlling the velocity of an industrial robot according to claim 3, wherein a playback operation for the first time is performed while involving modification of the control cycle, and data related to a maximum velocity which is reached by such modification of the control cycle is stored in memory, whereafter in a playback operation for each of the second and following playback operations, the maximum velocity is computed in accordance with the thus stored data and the thus computed maximum velocity is used in place of the instruction velocity.

5. An apparatus for controlling the velocity of an industrial robot of the type which makes a playback operation between taught points and develops, after each required control cycle, a trigger signal which provides a timing for controlling the position of said robot with an aimed position provided by one of dividing points which divide a distance between the taught points into a plurality of sections, said apparatus comprising:

an allowable velocity setting means for setting an allowable velocity for a first step section or for each of step sections in an acceleration section or a deceleration section for each of axes of said industrial robot, a comparing means for comparing, at the first step section or at each of the step sections, an instruction velocity to each of said axes and the corresponding allowable velocity, a control cycle computing means responsive to a result of such comparison from said comparing means for modifying, when the instruction velocity is higher than the allowable velocity, a control cycle after which a next trigger signal is to be developed using individual values of the allowable velocity and the instruction velocity, a storage means for storing therein in a playback operation for the first time data related to a maximum velocity which is reached by modification of the control cycle by said control cycle computing means, and a maximum velocity computing means for computing, in a playback operation for any of the second and following times, the maximum velocity in accordance with the data from said storage means and for setting the thus obtained maximum velocity in place of the instruction velocity.

6. An apparatus for controlling the velocity of an industrial robot of the type which interpolates a distance between taught points with a predetermined locus to make a playback operation, comprising:

a velocity controlling means for converting an instruction velocity of movement between the taught points into instruction velocities for individual axes of said industrial robots, comparing each of the thus converted instruction velocities for said axes with a corresponding one of allowable velocities for said axes, selecting, when the instruction velocity is higher than the allowable velocity, one of said axes at which the ratio of the instruction velocity to the corresponding allowable velocity presents a maximum value, and modifying the instruction velocity of movement between the taught points such that the instruction velocity of the one axis may be lower than the allowable velocity;

a computing means for computing the thus modified instruction velocity of movement between the taught points; and a display means for displaying thereon the instruction velocity of movement thus computed by said computing means.

* * * * *